United States Patent [19]

Tardy

[11] Patent Number: 5,235,657
[45] Date of Patent: Aug. 10, 1993

[54] OPTICAL FIBER TAPPING COUPLER

[75] Inventor: André Tardy, Egly, France

[73] Assignee: Cegelec, Levallois Perret, France

[21] Appl. No.: 835,334

[22] Filed: Feb. 14, 1992

[30] Foreign Application Priority Data

Feb. 15, 1991 [FR] France ................... 91 01819

[51] Int. Cl.$^5$ ............................................. G02B 6/26
[52] U.S. Cl. ..................................... 385/48; 385/25; 385/28; 385/32; 385/42
[58] Field of Search ............... 385/28, 24, 29, 25, 385/30, 32, 42, 44, 50, 48

[56] References Cited

U.S. PATENT DOCUMENTS

| | | | |
|---|---|---|---|
| 4,557,552 | 12/1985 | Newton et al. | 385/48 X |
| 4,747,652 | 5/1988 | Camp et al. | 385/48 X |
| 4,759,605 | 7/1988 | Shen et al. | 385/48 X |
| 4,784,452 | 11/1988 | Hodge et al. | 385/48 X |
| 4,802,723 | 2/1989 | Miller | 385/48 |
| 4,887,880 | 12/1989 | Levinson | 385/48 X |
| 4,950,046 | 8/1990 | Hughes et al. | 385/33 X |
| 4,956,550 | 9/1990 | Edwards et al. | 385/48 X |
| 4,961,620 | 10/1990 | Uken et al. | 385/32 X |
| 4,983,007 | 1/1991 | James et al. | 385/32 x |
| 4,989,939 | 2/1991 | Cox et al. | 385/32 X |
| 5,037,170 | 8/1991 | Uken et al. | 385/32 |
| 5,039,188 | 8/1991 | Williams | 385/48 |
| 5,040,866 | 8/1991 | Engel | 385/32 |
| 5,069,519 | 12/1991 | James et al. | 385/32 |
| 5,090,792 | 2/1992 | Koht et al. | 385/32 |
| 5,146,521 | 9/1992 | Hartog | 385/48 |

FOREIGN PATENT DOCUMENTS

| | | | |
|---|---|---|---|
| 3429947 | 2/1986 | Fed. Rep. of Germany | 385/48 X |
| 8906815 | 7/1989 | United Kingdom | 385/48 X |

OTHER PUBLICATIONS

Patent Abstracts of Japan, vol. 11, No. 109 (P-564)(2556) Apr. 7, 1987 & JP-A-61 258 205 (Furukawa) Nov. 15, 1986.

Primary Examiner—Brian Healy
Attorney, Agent, or Firm—Sughrue, Mion, Zinn, Macpeak & Seas

[57] ABSTRACT

An optical tapping coupler for a cable including at least one optical conductor (1) constituted by a step-index glass fiber which is covered by a plastic covering. First means (3 & 4, 5 & 6, 7, 8, 12) enable a determined position and a determined curvature to be given to a portion of each optical conductor of the cable, with each optical conductor being dissociated from the rest of the cable at the tapping location. Second means (21, 22) enable one end of each auxiliary optical conductor (30) to be mechanically brought against a respective cable optical conductor, with a small angle of incidence, in the region in which the cable conductor presents the determined curvature. Optical-index-matching third means are provided between the end of each auxiliary optical conductor and the cable optical conductor against which the end is positioned. The invention is used in particular for multi-station local network buses.

11 Claims, 2 Drawing Sheets

OPTICAL FIBER TAPPING COUPLER

FIELD OF THE INVENTION

The invention relates to a tapping coupler designed to inject and/or extract optical energy at an arbitrary point along at least one optical conductor, without it being necessary to alter or break the conductor, and in particular the invention relates to a connector for an optical cable, which connector is designed to constitute a data-transmission bus, usually a bidirectional bus.

BACKGROUND OF THE INVENTION

Developing transmission by optical conductors, in particular in local networks that have many stations and changing configurations, leads to researching ways of enabling couplers to be connected along an optical conductor without having to break or alter the optical conductor.

Connecting station equipment to an optical conductor often requires relatively difficult operations to be performed on site, particularly for optical conductors used in industrial networks, and these operations can give rise to non-negligible losses, e.g. of about one decibel per equipment connection.

A known way of solving this problem makes use of passive optical T-type couplers made either using "fiber" technology, or using "planar guided optics" technology. This adds an insertion loss of one decibel per coupler to the loss of one decibel due to each connection, and consequently reduces the number of items of equipment that can be served by one common optical conductor.

Another way of solving the problem consists in using regenerative couplers. However, the number of items of equipment that can be served by the same conductor is also limited because of the increase in the propagation times due to the delays caused by regenerative processing at the couplers and to the build up of jitter in the transmitted signal.

SUMMARY OF THE INVENTION

The invention therefore provides an optical tapping coupler designed to inject and/or extract optical energy at an arbitrary point along at least one optical conductor, without it being necessary to alter or break the conductor, and in particular the invention provides a connector for an optical cable, which connector is designed to constitute a data-transmission bus.

The optical tapping coupler is designed to be mounted on a cable including at least one optical conductor constituted by a step-index glass fiber which is covered by a plastic covering.

According to a characteristic of the invention, the coupler includes first means for giving a determined position and a determined curvature to a portion of each cable optical conductor to be connected, each optical conductor to be connected having the cable sheath removed at the tapping location so that an auxiliary optical conductor can be connected thereat, second means for mechanically bringing one end of each auxiliary optical conductor against a respective cable optical conductor in the region in which the cable conductor presents said determined curvature, with a small angle of incidence for each auxiliary optical conductor relative to the cable optical conductor against which it presses laterally, and optical-index-matching third means provided between the end of each auxiliary optical conductor and the cable optical conductor against which the end is positioned, which third means are used for locally transmitting optical energy in radiated mode between two optical conductors, one of which is a cable conductor and the other of which is an auxiliary conductor, with energy being transmitted within said conductors in guided mode.

The invention, its characteristics and its advantages are specified in the following description given with reference to the figures listed below:

DESCRIPTION OF THE PREFERRED EMBODIMENT

Figure 1:
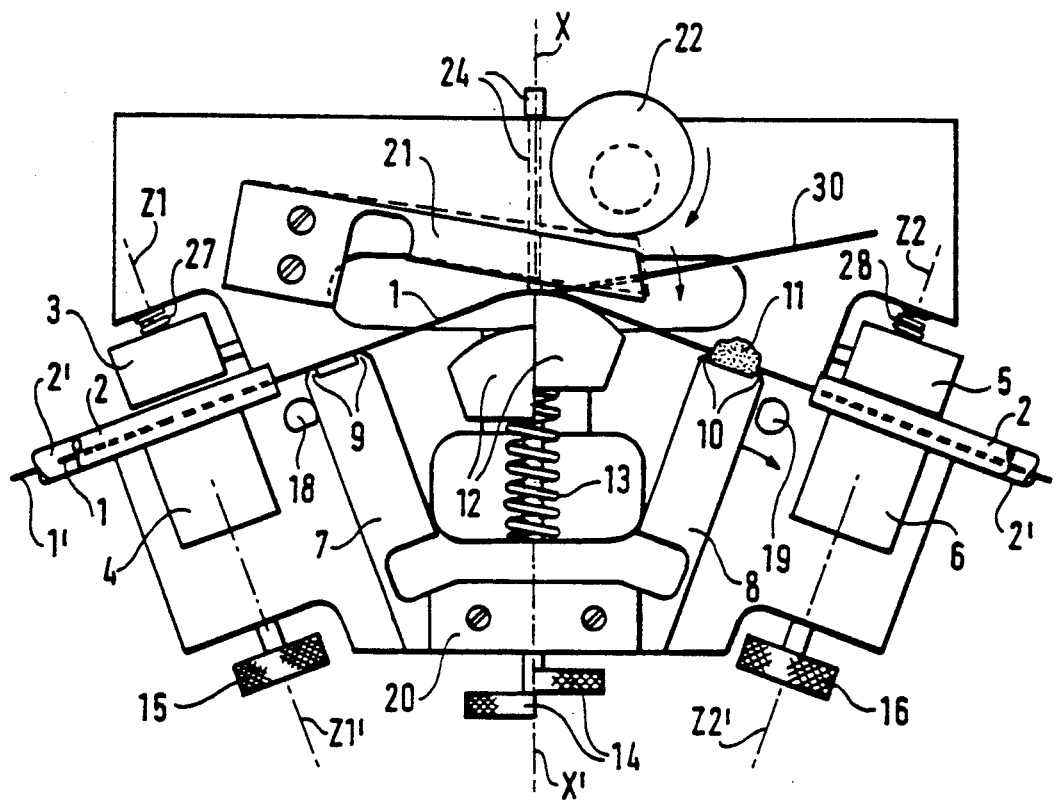
FIG. 1 is a diagrammatic elevation view in section of a tapping coupler of the invention.

The tapping coupler shown in FIG. 1 is designed to enable at least one item of optical transmitter-and/or-receiver equipment (not shown) to be connected to at least one optical conductor 1 of a cable, e.g. of the "free structure" type, the conductor being conventionally composed of an optical fiber made of glass protected by a plastic covering and housed inside an insulating sheath 2, the fiber itself being of the step-index type.

In one embodiment, a cable optical conductor is constituted by a fiber having a core diameter of 200 $\mu$m, a diameter including glass cladding of 280 $\mu$m, and a diameter including plastic covering of about 500 $\mu$m.

An auxiliary optical conductor 30 connects an electro-optical transducer (not shown) of the equipment to be connected to a cable optical conductor inside the tapping coupler. The auxiliary optical conductor is also constituted by an optical fiber covered by a protective covering.

A light-emitting diode or a laser diode transmits signals in optical form over the auxiliary optical conductor from the equipment. Reception may be provided by a semiconductor photodiode.

In the embodiment proposed, the tapping coupler is designed to receive two optical conductors 1 and 1', and to enable a respective auxiliary optical conductor 30, 30' to be connected simultaneously onto each of the two optical conductors, so as to provide separate-channel bidirectional transmission.

The tapping coupler is organized so as to enable the two cable optical conductors 1 and 1, to pass through a housing 0 in which the other component parts of the coupler are housed, the housing 0 preferably being organized in known manner, e.g. by associating hinged or separable portions together so that they close onto the conductors at any chosen location between the ends thereof.

For this purpose, the housing 0 contains two locking devices for holding cable sheaths stationary, each device being constituted by a set of jaws 3 & 4 and 5 & 6 designed to hold the sheaths 2 and 2' stationary on either side of a central region in which the optical conductors in question have their respective sheaths 2, 2' locally removed so as to enable connection to be made.

At least one of the jaws in each set 3 & 4 or 5 & 6 includes guides, e.g. parallel grooves, for positioning a portion of each sheath 2 or 2' before the sheaths are held stationary by bringing together the jaws in each set.

In the embodiment proposed, one of the jaws 4 or 6 in each set is fixed, whereas the other one 3 or 5, which is a moving jaw, is returned to its open position by a spring 27 or 28 and is applied against the corresponding fixed jaw under the action of a tightening member 15 or 16, shown as a knurled-head screw.

The right half of FIG. 1 shows the set of jaws 5 & 6 when they are together, whereas the left half of FIG. 1 shows the jaws 3 & 4 apart before the sheaths 2, 2' are held stationary.

A tensioner device is associated with the sets of jaws so as to fix the cable optical conductors and to apply a certain tension thereto in the connection region in which the optical conductors are without sheaths.

The tensioner device is shown equipped with two resilient tensioner arms 7 and 8 each fixed at one of its ends to a common base 20, the arms being disposed so that they bear simultaneously via their otherwise free other ends against the optical conductors 1 and 1' between the sets of jaws 3 & 4 and 5 & 6, along the path of the conductors between the sets of jaws and on respective sides of a central region.

The free end of each of the tensioner arms 7, 8 is disposed in the tapping coupler housing so as to be level with the paths of the optical conductors 1 and 1' between the sets of jaws, the two conductors being applied parallel to one another against each one of the free ends in order to be held stationary thereagainst.

In the proposed embodiment, each free end includes two parallel bearing surfaces respectively referenced 9 for tensioner arm 7 and 10 for tensioner arm 8, the bearing surfaces being disposed transversely relative to the path of the cable optical conductors against which they are positioned.

The optical conductors 1 and 1' are glued onto the free ends of the tensioner arms 7 and 8 so as to be held stationary relative thereto. For this purpose, a recess for positioning a drop of adhesive is provided between the two bearing surfaces on the free end of the tensioner arm, as shown in FIG. 1 for the drop of adhesive 11 between the bearing surfaces 10 of the tensioner arm 8.

In the invention, the optical connections are made in the central region situated between the two tensioner arms and therefore between the sets of jaws. In the central region, the optical conductors are without their sheaths, leaving each cable optical conductor with its optical fiber its protective covering only.

For the purposes of optical connection, each optical conductor 1, 1' is curved in the central region in which each optical conductor is without its sheath, and in which one end of each auxiliary optical conductor 30 or 30' is applied substantially at a point.

Optical energy transfer is obtained by guided modes being coupled to radiating modes and vice versa where optical contact is made between each of the auxiliary optical conductors and the main optical conductor against which one end of that auxiliary optical conductor is positioned.

The curvature given to each main optical conductor 1 or 1' in the connection region in which it is stripped of its sheath 2 or 2' is chosen such that optimum optical energy transfer is obtained between connected fibers via the protective covering that covers the fiber of the cable optical conductor.

In known manner, the propagation of light through an optical fiber is expressed in terms of modes or, by analogy with geometrical optics, in terms of rays.

For example, a group of modes, i.e. a family of rays, groups together about 10,000 modes into about a hundred groups for an optical fiber whose core diameter is 200 $\mu$m and whose numerical aperture is 0.21 and presents a slope $\theta$ relative to the axis of the fiber. The rays are guided so long as the angle $\theta$ is less than a limit angle $\theta_m$ characteristic of the materials making up the optical conductor of which the fiber is part.

In a curved portion of fiber assumed to be located in a plane, the slopes of the modes increase and those modes whose slopes exceed the limit angle $\theta_m$ propagate out of the fiber core and through the covering. The radiated energy increases with the length of curved fiber and inversely with the radius of curvature.

The radiated energy is a function of the distribution of energy among the incident modes at a branch. Said distribution changes during the course of propagation along a fiber to reach virtual equilibrium after a given length of the fiber.

Insofar as step-index fibers present high mode coupling due to their intrinsic defects, such as fluctuations in index and in diameter, the state of equilibrium is reached quickly, in particular compared with graded-index fibers.

Only a fraction of the modes is concerned by energy exchange between guided modes and radiating modes, and any branch made in this way acts as a mode filter. Therefore, it is important to have a fiber which has high intrinsic coupling so as to provide a quick return to mode equilibrium, thereby ensuring uniformity of response in the event that a plurality of items of equipment are connected by individual couplers along a common shared optical conductor.

In a preferred embodiment, in order to obtain low insertion loss, e.g. about 0.2 decibels, enabling about twenty items of equipment to be served by the same optical conductor, the chosen radius of fiber curvature is about fifteen millimeters and the angular sector corresponding to the length of curved fiber is about forty degrees.

Figure 3:
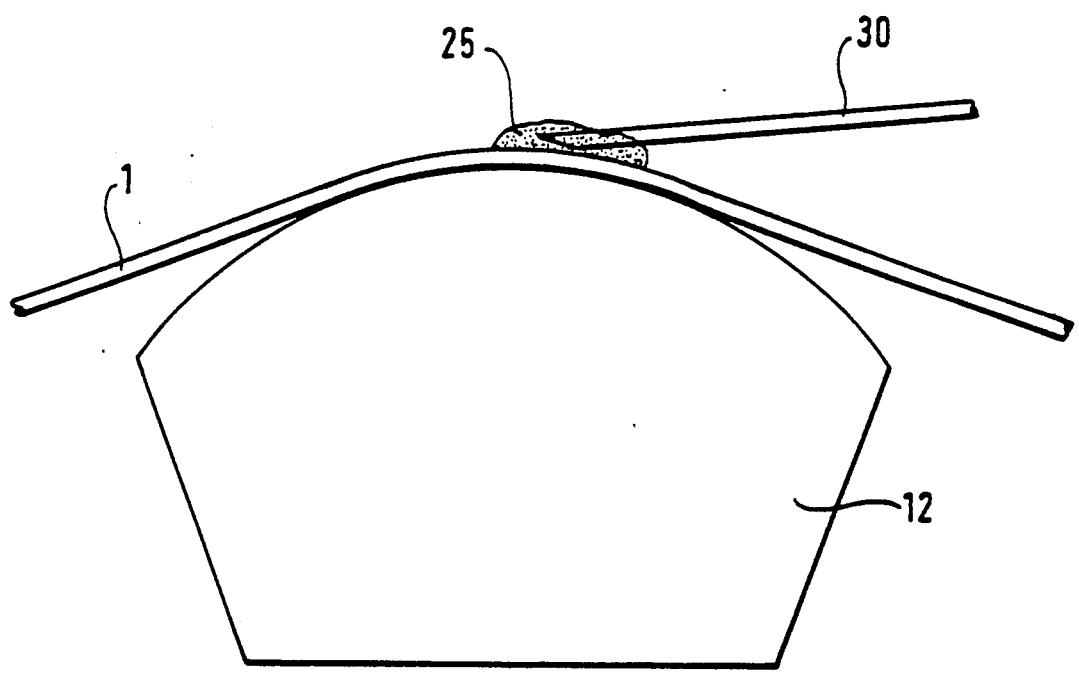
FIG. 3 is a diagram for defining the optical connection device proper of a coupler of the invention.

Radiated energy transmission in particular from a cable optical conductor to an auxiliary optical conductor is improved by locally changing the propagation conditions by applying a drop 25 of optical-index-matching material, e.g. a gel, in a region of the curved portion of the cable optical conductor against which region the bevelled end of the auxiliary optical conductor is positioned (see FIG. 3).

The index-matching material serves as an intermediary both for transmitting light energy escaping from a curved region of a cable optical conductor to the cut end of the core of an auxiliary optical conductor suitably applied against the cable optical conductor in the region of curvature, and also for transmitting light energy in the opposite direction.

Using a gel instead of an adhesive enables a connection, e.g. that has become unnecessary, to be eliminated by merely withdrawing the corresponding auxiliary optical conductor and wiping off the gel, with the cable optical conductors being held in place in the housing, for example.

The index-matching material preferably has an intermediate refractive index lying between the index of the cable optical conductor and the index of the auxiliary optical conductor, e.g. equal or close to the index of the core of the auxiliary optical conductor, i.e. about 1.45 in the event that the auxiliary optical conductor is composed of a fiber such as a "PCS" fiber having a silica core that is 600 μm in diameter, a covering made of polymer, and a numerical aperture of 0.4.

The bevelled end of an auxiliary optical conductor is designed to align the axis of an auxiliary optical conductor with the tangent to the middle arc of the cable optical conductor, to the maximum possible extent, in the region in which the cable optical conductor is curved, at the point where said arc meets said axis.

For example, the angle of the bevelled end of an auxiliary optical conductor via which end the auxiliary optical conductor bears against a cable optical conductor lies in the range fifteen degrees to twenty degrees relative to the axis of the auxiliary optical conductor, in particular due to the mechanical stresses which limit reduction of said angle.

Positioning one end of an auxiliary optical conductor on a cable optical conductor implies holding one conductor stationary relative to the other. In the proposed embodiment, the end of the auxiliary optical conductor is mechanically brought close to the cable optical conductor which has previously been locked stationary in predetermined manner.

In the described embodiment of the tapping coupler, the radius of curvature chosen for each of the two optical conductors 1 and 1' of a tapping coupler is about fifteen millimeters. The conductors are constrained to have this radius of curvature by a convex abutment surface of a positioning jig 12 in the form of a bulging pusher bearing against the conductors in the central region situated between the tensioner arms 7 and 8.

Figure 2:
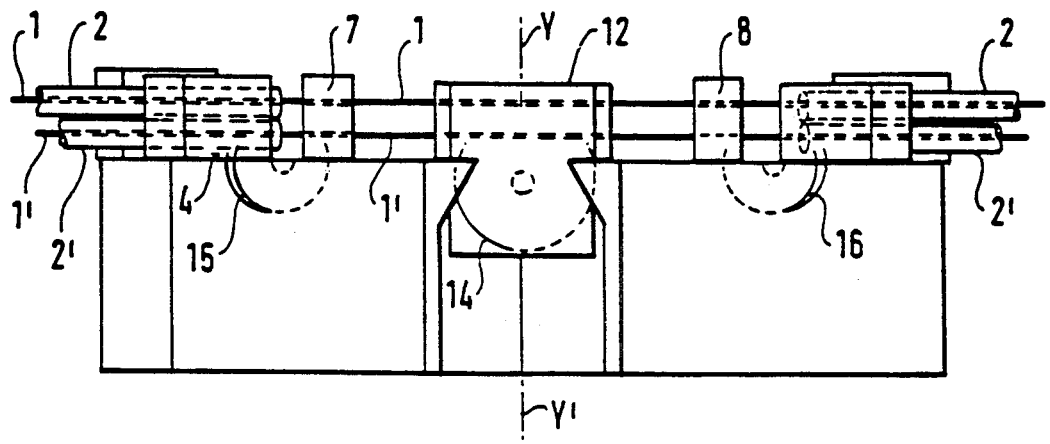
FIG. 2 is a diagrammatic bottom view in section of the coupler shown in FIG. 1.

For example, the jig 12 is symmetrical about a transverse midplane represented by line XX' in FIG. 1 and line YY' in FIG. 2. The midplane is disposed transversely relatively to the paths of the optical conductors 1,1' through the housing, thereby also constituting a plane of symmetry for the tensioner arms 7, 8 and for the sets of jaws 3 & 4 and 5 & 6 in the tapping coupler shown.

For example, the jig 12 is slidably mounted with almost no clearance in a support (not shown) fixed inside the housing, which support ensures that the jig is accurately positioned laterally. The jig is shown half in its retracted position in the left half of FIG. 1 and half in its normal extended position in the right half, a compression spring 13 enabling the abutment surface to be applied against the conductors with a predetermined maximum pressure.

A knob 14 enables the jig to be displaced; an abutment 24 which is screw-adjustable in this case enables the normal extended position of the jig 12 at the end of its stroke in the support inside which it slides to be defined accurately.

For example, the convex abutment surface of the jig 12 on which the optical conductors 1 and 1' rest is a sector of a cylinder of about forty degrees of arc whose radius is defined above and which develops identically on either side of the midplane represented by lines XX' and YY'.

In this example, the same angles are also used for the longitudinal axes of the tensioner arms 7 and 8, and for the sets of jaws 3 & 4 and 5 & 6 which are disposed such that the cable optical conductors curve symmetrically on either side of the midplane represented by lines XX' and YY' following the profile of the convex abutment surface of the jig 12, e.g. by means of guides, such as guide tabs or parallel guide grooves, from the jig which they leave following a rectilinear path developing in a plane tangential to the convex abutment surface of the jig on either side of the above-defined transverse midplane.

The angular position given to the cable optical conductors 1, 1' by each set of jaws is then about seventy degrees relative to the above-defined transverse midplane so as to avoid the insertion loss which could be produced in the case of uncontrolled curvature.

The tensioner arms 8, 9 are preferably made of a resilient material and are fixed via respective ones of their ends to a common base 17. The free ends of the arms are brought slightly towards the jig 12 by means of an auxiliary device which also enables them to return elastically to their initial position when said device is released.

In the example presented, the auxiliary device uses two rotary rods 18, 19 mounted on a fixed component part of the coupler and each associated with one of the tensioner arms 7, 8, along which it bears transversely. Each rod 18, 19 includes a side flat, and a drive head, e.g. of the screwhead type, which can be driven during the operations of connecting a tapping coupler.

By a tensioner arm bearing against its associated rod 18 or 19 outside the flat on the rod, the arm is held in its stressed position in which it is brought towards the jig 12. By rotating the rod, the arm is released conventionally when it reaches the flat, as can be seen in FIG. 1 in which the tensioner arms are each shown in one of the above-mentioned positions.

In order to place the two optical conductors 1 and 1' in the tapping coupler, after each of their sheaths 2, 2' has been removed over a length corresponding to the path length provided for each cable optical conductor between the two sets of jaws, the two conductors must be inserted between the jaws of each set and be positioned on the free ends of the tensioner arms 7, 8 which are in the prestressed state, and on the convex abutment surface of the jig 12 which is in its retracted position to facilitate insertion.

The optical conductors 1, 1' are glued onto the free ends of the tensioner arms 7, 8 by means, for example, of a quick-drying adhesive, after the jig 12 has been put back (manually in this case) into its normal extended position, and before the arms have been released.

Because of the resilience of the two tensioner arms 7, 8, releasing them leads to tension forces being created on each of the optical conductors 1 and 1' in the region of the conductors situated between the tensioner arms.

The magnitude of the forces applied is, for example, about two newtons, and is chosen so as to provide accurate curvature of the optical conductors. The chosen magnitude is obtained in a manner known per se as a function of the choices made when defining the tensioner arms.

Connecting an auxiliary optical conductor 30 to a cable optical conductor while complying with the above-mentioned conditions is obtained with the assistance of a mechanical positioner arrangement co-operating with the jig 12, and of an actuator device.

The positioner arrangement includes at least one supporting part 21 for supporting the auxiliary optical conductors, which supporting part as shown has an elongate shape and is made of a resilient material so that one of its two ends (non-fixed) is free to move slightly towards the jig 12.

The actuator device is shown including at least one cam 22 disposed laterally relative to the supporting part 21 and rotatably mounted in the coupler in a portion which is fixed relative to the support (not shown) in which the jig 12 slides.

The other end of the supporting part 21 is held stationary on a fixed portion which is optionally the fixed portion in which the cam 22 is mounted. Said other end of the supporting part is fixed such that the supporting part can be positioned in a manner known per se relative to the jig 12 when the jig is in its normal extended position. Such positioning is preferably performed during factory assembly of the tapping coupler and is not designed to be readjusted on site during mounting of the coupler onto the cable optical conductors which it is to equip.

The free end of the supporting part 21 is shown connected to the fixed end of the supporting part via a flexible arm designed in a manner known per se so that it bends only in a predetermined manner under the action of the rotary cam 22, such that the free end can only travel through a previously set accurate trajectory, in particular towards the jig.

The single auxiliary optical conductor or, in this case, both of the auxiliary optical conductors, to be connected to the optical conductors 1, 1' on the jig 12 is/are held stationary at the free end of the supporting part 21 in the vicinity of its/their end(s) that is/are bevelled for the purposes of connection.

Positioning the auxiliary optical conductors is preferably also performed accurately during factory assembly of the tapping coupler in positioning and fixing devices, e.g. of the groove or duct type, provided for this purpose in the supporting part 21 at its free end on which the auxiliary optical conductors are, for example, glued after accurate positioning optionally assisted by measuring the performance obtained during positioning.

As indicated above, each auxiliary optical conductor is then disposed so that it comes into contact with a cable optical conductor on the jig 12 in its normal extended position, each auxiliary conductor extending along a rectilinear path from the connection region in which its cut core comes laterally into contact with the cable optical conductor via the bevelled end of the auxiliary conductor and via a drop 25 of index-matching material.

In the proposed embodiment, the connection extends over a portion covering an angle of about ten degrees and located on the portion of cable optical conductor that is curved on the jig 12 and that is virtually covered by the bevelled end of the auxiliary conductor, and in a sector of the curved portion that covers about degrees from the transverse midplane of the jig, the other above-defined conditions of connection also being met.

In a preferred embodiment, each tapping coupler is brought on site already equipped with its auxiliary optical conductors previously positioned in optimum manner in the factory, e.g. during assembly of the coupler.

Mounting the coupler onto the cable optical conductors to be equipped is performed in the above-mentioned manner as regards positioning the conductors on the jig, on the tensioner arms, and in the sets of jaws.

Connecting the auxiliary optical conductors to the cable optical conductors on site by applying the ends (previously each equipped with a drop of index-matching material) of the auxiliary conductors against the curved flank of one of the cable conductors is performed merely by bringing the end of the supporting part 21 towards the jig 12 by means of the cam 22.

In this embodiment, the supporting part 21 is designed to press two auxiliary optical conductors simultaneously onto respective cable optical conductors on the same side of the jig 12 relative to the above-defined transverse midplane thereof represented by lines XX', YY'.

It is easy to provide an assembly enabling two auxiliary optical conductors to be connected in opposite directions on respective cable optical conductors on respective sides of the transverse midplane of the jig 12 by merely adding a second supporting part 21 and a second cam 22 symmetrically relative to the transverse midplane inside the housing of the tapping coupler of the invention.

The auxiliary optical conductors pointing in opposite directions then enable light energy to be transmitted in opposite directions via cable optical conductors that are parallel to each other.

I claim:

1. In an optical tapping coupler designed to be mounted at an arbitrary tapping location along a cable including at least one optical conductor (1) constituted by a step-index glass fiber covered by a plastic covering, and said plastic covering being, in turn, covered by an insulating sheath, said coupler being used either for injecting optical energy into at least one such optical conductor or for extracting optical energy therefrom at the tapping location, the improvement wherein said coupler includes first means (3 & 4, 5 & 6, 7, 8, 12) for giving a determined position and a determined curvature to a portion of each optical conductor to be connected, each optical conductor to be connected having said insulating sheath removed at the tapping location so that an auxiliary optical conductor (30) can be connected thereat, second means (21, 22) for mechanically bringing one end of each auxiliary optical conductor against a respective cable optical conductor in the region in which the cable conductor presents said determined curvature, with a small angle of incidence for each auxiliary optical conductor relative to the cable optical conductor against which it presses laterally, and optical-index-matching third means (25) provided between the end of each auxiliary optical conductor and the cable optical conductor against which the end is positioned, said third means being used for locally transmitting optical energy in radiated mode between two optical conductors, one of which is a cable conductor and the other of which is an auxiliary conductor, with energy being transmitted within said conductors in guided mode.

2. An optical tapping coupler according to claim 1, wherein the first means include a positioning jig (12) equipped with a convex abutment surface which is externally equipped with one or more guides for each cable optical conductor along an arc of a circle of determined radius, and locking means (3 & 4, 5 & 6, 7, 8) for holding each cable optical conductor stationary, said locking means being disposed on respective sides of the jig inside the coupler and holding each optical conductor stationary by traction once said optical conductor is in position in a jig guide.

3. An optical tapping coupler according to claim 2, wherein the jig is movable in translation inside the coupler between a retracted position enabling each cable optical conductor to be put into position on the convex abutment surface of the jig and a determined extended position for which each cable optical conductor is in a determined position on the abutment surface.

4. An optical tapping coupler according to claim 3, further including a return spring (13) urging the jig into its extended position and an abutment (24) via which said extended position of the jig inside the coupler is determined.

5. An optical tapping coupler according to claim 2, wherein the locking means combine two sheath-locking devices (3 & 4 and 5 & 6) fixed inside the coupler on respective sides of the jig, and at least one cable-optical-conductor-tensioner device (8, 9) which is active in the region in which the cable optical conductors are dissociated between the two locking devices, for respectively enabling the cable optical conductor(s) to be positioned and made taut on the jig in its extended position.

6. An optical tapping coupler according to claim 5, further including a tensioner device equipped with two resilient tensioner arms (8 and 9), each arm having a fixed end fixed relative to the coupler and a free end equipped with a fixing device for fixing each cable optical conductor thereto, each free end being positioned along a path provided for the cable conductors between the jig and a respective sheath-locking device and being resiliently urged towards the locking device so as to subject the cable optical conductors resting on the jig between the tensioner arms to determined traction in opposite directions, thereby ensuring that the cable conductors are held taut on the jig.

7. An optical tapping coupler according to claim 2, wherein the second means include both an auxiliary-optical-conductor-positioning arrangement (21) enabling one end of each of the auxiliary optical conductors to be applied in a determined position against a respective cable optical conductor, with a small angle of incidence, in a region of the respective cable optical conductor that is situated on the jig, and an actuator device (22) for actuating the positioning arrangement and applying the end of each auxiliary optical conductor against each cable optical conductor.

8. An optical tapping coupler according to claim 7, further wherein said second means comprises an auxiliary-optical-conductor-positioning arrangement constituted by a resilient support part (21) having one end fixed relative to the coupler and the other end free, the free end both including a fixing device (9, 10, 11) for fixing a projecting end of each auxiliary optical conductor that is provided, and also being situated in the proximity of and facing the convex abutment surface of the jig when the jig is in its extended position.

9. An optical tapping coupler according to claim 1, wherein said auxiliary optical conductors are permanently fixed prior to connecting the coupler to a cable.

10. An optical tapping coupler according to claim 2, wherein the jig, the sheath-locking devices, and the tensioner arms are disposed symmetrically relative to a plane of symmetry (XX', YY') of the jig.

11. An optical tapping coupler according to claim 10, wherein two supporting parts (21) are provided which are symmetrical relative to said plane of symmetry (XX', YY') of the jig, so that the auxiliary optical conductors they receive point in opposite directions, thereby enabling light energy to be transmitted in opposite directions via cable optical conductors that are parallel.

* * * * *